April 21, 1959 — P. SOLHEIM — 2,883,163
ROTATABLE HEATING MEMBERS FOR HEAT EXCHANGERS
Filed Nov. 26, 1956 — 2 Sheets-Sheet 1

INVENTOR:
PEDER SOLHEIM

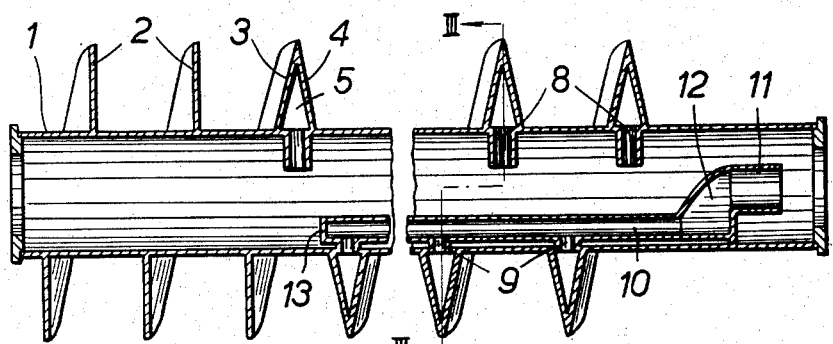
FIG.2.
FIG.4.
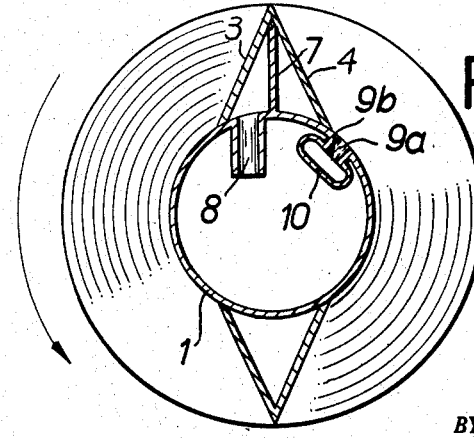
FIG.3.
INVENTOR.
PEDER SOLHEIM.
BY

United States Patent Office 2,883,163
Patented Apr. 21, 1959

2,883,163
ROTATABLE HEATING MEMBERS FOR HEAT EXCHANGERS

Peder Solheim, Leirvik, Stord, Norway, assignor to A/S Stord, Leirvik, Stord, Norway Application November 26, 1956, Serial No. 624,357

Claims priority, application Norway December 2, 1955

4 Claims. (Cl. 257—79)

This invention relates to rotataable heating members for heat exchangers, of the kind carrying hollow steam containing screw threads or protrusions on their outer surface, for instance heating members for indirectly heated cookers for herrings and similar materials, steam heated dryers for the same purpose, and the like.

It is an object of the present invention to obtain a rotatable heating member of the stated kind, wherein a highly efficient heat transfer is obtained. A further object of the present invention is to obtain a rotatable heating member wherein live steam supply and condensate discharge do not interfere mutually, and wherein the supply of live steam to the interiors of a plurality of individual spaces is not blocked by the condensate.

A further object of this invention is to obtain a rotatable heating member of the stated kind, enabling easy assembly of parts and avoiding complicated welding operations which may be necessary within closed spaces.

Other and further objects and features of the present invention will appear clearer from the following description of a preferred embodiment which is described by way of example with reference to the accompanying drawings, wherein:

Figure 2 is an axial sectional view of the ends of the conveying member of Figure 1, somewhat enlarged and simplified by showing the steam supply means and the discharge means arranged in diametrically opposed relationship;

Figure 3 is a simplified section as taken on the line III—III of Figure 2 illustrating the actual positions of the steam supply means and the steam discharge means;

Figure 4 is a view illustrating the means for supplying live steam to and discharging condensate from the conveying member of Figures 1, 2 and 3, as shown in an axial sectional view of the steam supply end of a herring cooker.

Figure 1:
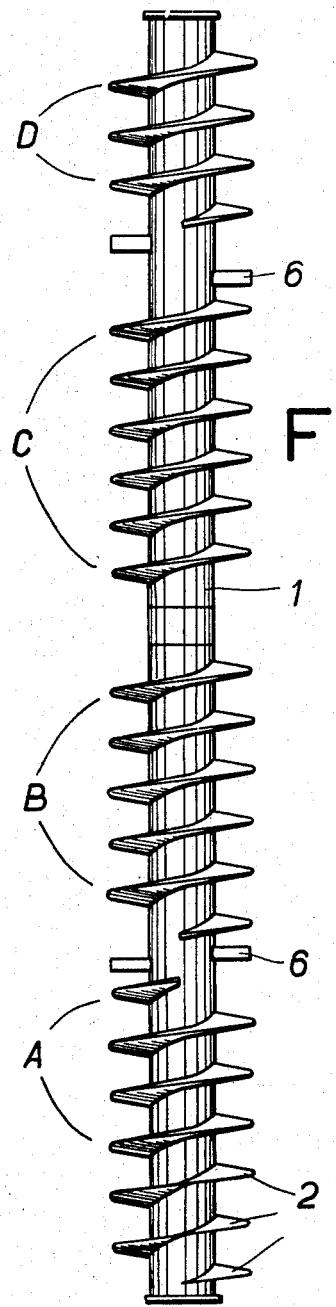
Figure 1 is a side view of a rotatable screw conveying member of a continuous cooker, preferably for use in cooking animal materials during manufacture of feedstuff therefrom.

Such rotatable heating members as mentioned above are known, comprising a hollow cylinder which on its outer cylindrical face is provided with hollow steam heated screw threads or protrusions, the interior of which is divided into separate spaces which are individually charged with live steam.

However, I provide a rotatable heating member for steam heated heat exchangers according to the present invention comprising a hollow cylinder, means for rotatably supporting said cylinder on a longitudinal axis, protrusions arranged on the outer cylindrical face of said cylinder, said protrusions being hollow and divided into individual spaces spaced along the length of said hollow cylinder, a plurality of stub pipes each leading from an individual one of said hollow spaces to a point near the axis of said cylinder, a steam supply pipe arranged in the interior of said hollow cylinder adjacent to the inner wall thereof, a plurality of communication openings each leading from said steam supply pipe to an individual one of said hollow spaces, and a condensate removing means comprising a condensate removing pipe having an intake opening ending near the bottom of the interior of said hollow cylinder.

It is preferred that said live steam supplying pipe comprises a pipe arranged in close proximity to the inner cylindrical wall of said cylinder, a plurality of pairs of openings being arranged in alignment in said cylindrical wall and said pipe respectively at each individual one of said individual spaces. Most preferably, the cross section of said pipe is oval or ovate, facing with a longer side towards said cylindrical wall. The openings of the cylindrical wall and the pipe, respectively, are welded together during assembly by seam welding so as to ensure live steam to be safely and leakage-free supplied to the interior of said spaces through said pipe.

In order to obtain that condensate liquid is emptied through the stub pipes safely and without interfering with the steam supply, it is preferred that each of said stub pipes is located immediately ahead of an end wall of an individual space—the term "ahead" being intended to refer to the direction of rotation—and further that the communication opening between said steam supplying pipe and each individual space is arranged immediately behind the leading end wall of said space, the term "behind" being taken in the same rotational sense as set forth above. Preferably, said end walls referred to comprise partition plates dividing a hollow screw thread into individual spaces, or dividing annular or disc formed protrusions into a discontinuous space.

By the latter arrangement it is obtained that the steam is forced to pass through the entire individual space, and further that the openings from the live steam supplying pipe are not blocked by condensate liquid, as the latter is moved along by the leading partition plate and thereupon emptied through the stub pipes.

Now referring to the figures shown, in a cooker for cooking animal materials mostly of marine origin in the processing of oil and meal therefrom, a rotatable conveyer comprises a hollow cylinder as indicated generally by the reference numeral 1 of Figure 1. In the conveying member illustrated the first two screw threads 2 are massive and are formed from plate metal which has been shaped to the desired shape and thereupon welded to the cylinder 1. Thereafter follows a first group A of hollow screw threads, having a cross sectional design as shown in Fig. 2 said design being obtained by shaping plate metal parts 3, 4 and mounting same so as to define a triangular hollow space 5 together with the cylindrical wall of the hollow cylinder 1. Further, after said first group A the hollow cylinder 1 carries paddles 6, the intention of which is to set the mass in motion, whereby in part an effective heat transfer is ensured, in part sticking of the mass to the heating areas is prevented. Thereafter, a second group B, a third group C, and a fourth group D of hollow screw threads follow. Between certain of said groups a set of paddles 6 or the like is arranged.

Referring now to Figure 3, partition plates 7 divide the screw threads into individual spaces extending over a full revolution of thread, and directly ahead of said plate with respect to the direction of rotation, a stub pipe 8 is arranged. During rotation, the partition plates 7 collect the liquid condensate formed in the corresponding individual space and convey same along, until the corresponding partition plate 7 has reached the position shown in Figure 3; in such position the condensate is emptied through the stub pipe 8 and into the hollow interior of the cylinder 1. The stub pipe 8 prevents said condensate from flowing back into the hollow space; in a manner to be described below, the condensate is thereupon emptied from the hollow cylinder.

Immediately behind the partition plate 7—the term still to be taken in the sense of rotation of the conveying screw member—an opening 9a is during manufacture drilled or otherwise cut out in the wall of the hollow cylinder. A pipe 10 having an oval or ovate cross section has been provided with corresponding openings 9b, and the openings 9a and 9b are now during manufacture brought to alignment by bringing the face carrying the opening of the pipe 9b adjacent to, preferably in engagement with the inner face of the cylindrical wall, whereupon the edges of the openings are welded together from the outside. Hereby, communication openings 9 leading from the pipe 10 into the individual spaces of the threads, are obtained. Naturally, during manufacture said welding is made before the plate metal pieces 3, 4 are welded to the hollow cylinder.

One end of the pipe 10 is secured to a circular pipe piece 11 by means of an adaptor piece 12, and the opposite end of the pipe 10 is closed at 13. Said pipe piece 11 is arranged coaxially with the cylinder 1. The closed end is usually the end adjacent to the inlet end of the present cooker. As indicated in Fig. 4, the cylinder is at said inlet end carried by a massive stub shaft 14, being provided with a pulley 15 or the like for rotating the hollow cylinder 1 in a rotational sense as indicated by an arrow in Fig. 3. The end wall of the housing of the cooker is provided with a bearing supporting the stub shaft 14. In the discharge end, a corresponding bearing 16 supports a hollow stub shaft 17. Said stub shaft telescopically encloses a stationary steam supplying pipe 18 the inner end of which is telescopically received within the stub pipe 11, and the outer end of said pipe 18 communicating with a steam supply 19.

A condensate removing pipe 20 extends through said steam supplying pipe 18, the inner end of said condensate removing pipe being bent downwardly and leading as a stub pipe 21 almost to the bottom of the hollow interior of the cylinder 1. The condensate removing pipe ends in its opposite end in a downwardly directed part 22 leading to a condenser, not shown.

It appears from the preceding that live steam is supplied through the stationary supplying pipe 18 and into the pipe piece 11, and therefrom through the pipe 10 into the individual hollow spaces of the threads. After having transferred its heat content by condensation, the condensate from the live steam is in the manner set forth above emptied through the stub 8. Hereby, the pressure from the supplied live steam will assist in removing the condensate. Some live steam will of course also follow through the stub pipes 8 into the hollow space in the interior of the cylinder 1, but this feature will not be of any disadvantage, as heat should also be transferred to the herring mass from the walls of said hollow cylinder.

In the embodiment disclosed herein, a very advantageous flow path for the steam supply to and from the hollow spaces is obtained, whereas the entire assembly is easy to manufacture.

It should be understood that the present invention may also be embodied for instance in the rotatable heating member of a steam heated drying apparatus having a rotating heating and/or conveying member comprising a hollow cylinder carrying hollow threads or protrusions on its outer surface. Therefore, the embodiment set forth above and illustrated in the appended drawings should be taken as merely illustrative and not limiting the scope of the present invention, reference being had to the appended claims for this purpose.

I claim:

1. A rotatable heating member for steam heated heat exchangers, comprising a hollow cylinder, means for rotatably supporting said cylinder on a longitudinal axis, protrusions arranged on the outer cylindrical face of said cylinder, said protrusions being hollow and divided into individual spaces spaced along the length of said hollow cylinder, a plurality of stub pipes each leading from an individual one of said hollow spaces to a condensate discharge point near the axis of said cylinder, a steam supply pipe arranged in the interior of said hollow cylinder adjacent the inner wall thereof, said steam supply pipe extending substantially the entire axial length of said hollow cylinder and having a closed end therein, a plurality of communication openings each leading from said steam supply pipe to an individual one of said hollow spaces providing a passageway for steam directly into said hollow spaces to supply steam independently of the discharge of condensate through said stub pipes, and a condensate removing means comprising a condensate removing pipe having an intake opening ending near the bottom of the interior of said hollow cylinder.

2. A rotatable heating member for steam heated heat exchangers, comprising a hollow cylinder, means for rotatably supporting said cylinder on a longitudinal axis, protrusions arranged on the outer cylindrical face of said cylinder, said protrusions being hollow and divided into individual spaces spaced along the length of said hollow cylinder, a plurality of stub pipes each leading from an individual one of said hollow spaces to a condensate discharge point near the axis of said cylinder, a steam supply pipe arranged in the interior of said hollow cylinder adjacent the inner wall thereof, a plurality of communication openings each leading from said steam supply pipe to an individual one of said hollow spaces, said communication openings being each arranged in the leading part of an individual space, and said stub pipes each providing the condensate and steam outlet in the trailing part of said space, when taken in the rotational sense of the heating member, and a condensate removing means comprising a condensate removing pipe having an intake opening ending near the bottom of the interior of said hollow cylinder.

3. A heating member as claimed in claim 1, wherein said steam supply pipe has an oval cross-section, a longer side of which is arranged eccentrically within said hollow cylinder and close to the inner wall thereof and provided with said communication openings, the edges of said communication openings being welded to corresponding communication openings in the wall of said cylinder.

4. A heating member as claimed in claim 3, wherein a pipe part is secured to the other end of said steam supply pipe in communication therewith and arranged concentrically within said cylinder at the steam supply end thereof, and a stationary steam supply pipe is arranged at said steam supply end and is telescopically connected with said pipe part to lead steam into the eccentrically arranged oval steam supply pipe.

References Cited in the file of this patent

UNITED STATES PATENTS

| 332,848 | Theisen | Dec. 22, 1885 |
| 2,328,395 | Neuman | Aug. 31, 1943 |

FOREIGN PATENTS

| 111,948 | Germany | Sept. 7, 1900 |